No. 740,045.

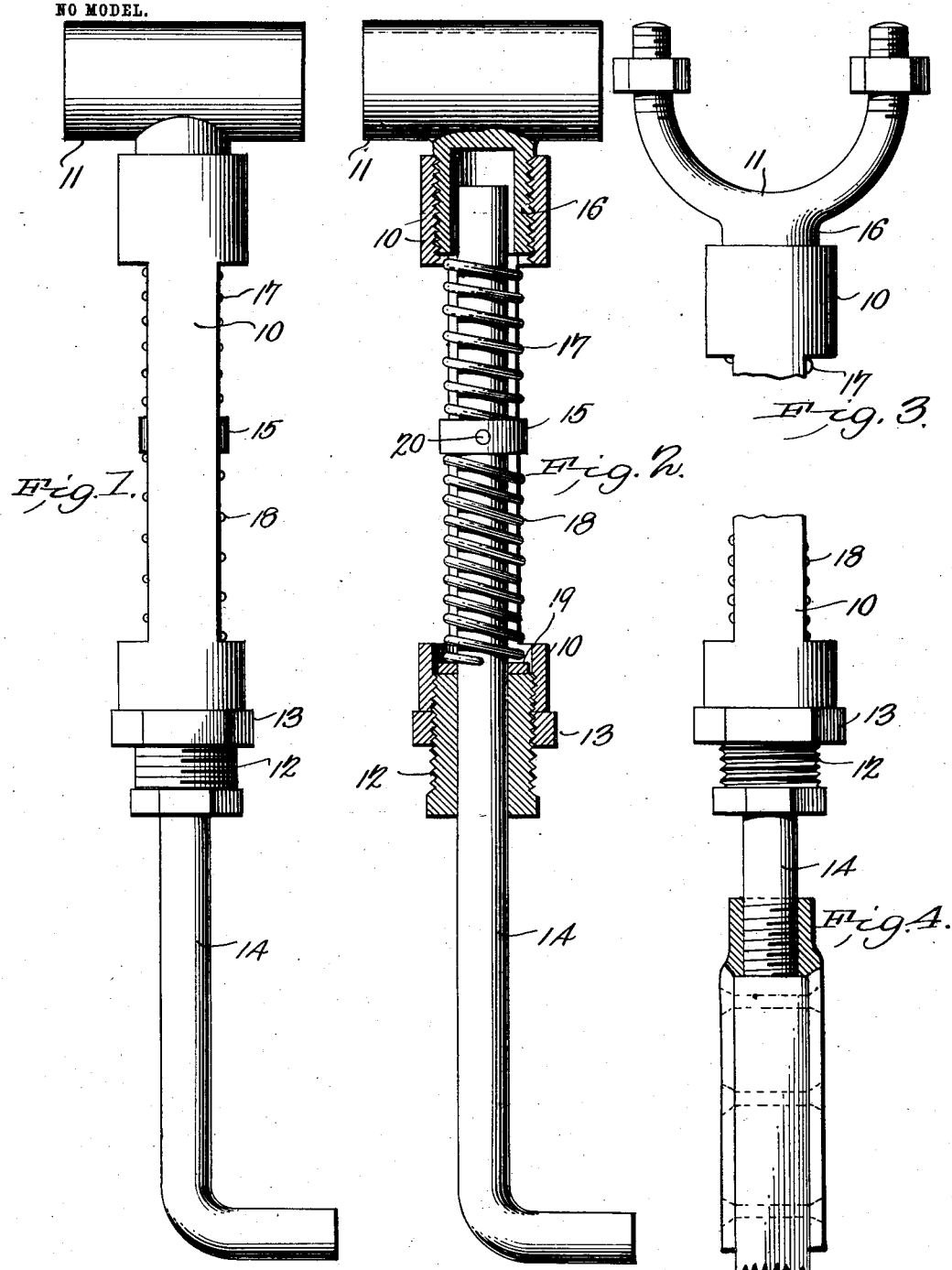

Patented September 29, 1903.

UNITED STATES PATENT OFFICE.

KNUTE RINGHEIM, OF RADCLIFFE, IOWA.

BINDER AND MOWER PITMAN.

SPECIFICATION forming part of Letters Patent No. 740,045, dated September 29, 1903.

Application filed June 17, 1903. Serial No. 161,908. (No model.)

*To all whom it may concern:*

Be it known that I, KNUTE RINGHEIM, a citizen of the United States, residing at Radcliffe, in the county of Hardin and State of Iowa, have invented a new and useful Binder and Mower Pitman, of which the following is a specification.

This invention relates to that class of connecting-rods wherein a certain degree of longitudinal yieldableness is requisite, such as those employed between the operating mechanism and the sickle-bars of harvesting and mowing machines, and has for its object to simplify and improve devices of this character and produce a device wherein the jars and concussions are absorbed and the operation rendered less destructive to connected parts; and the invention consists in certain novel features of construction, as hereinafter shown and described, and specified in the claims.

In the drawings illustrative of the invention, in which corresponding parts are denoted by like designating characters, Figure 1 is a plan view. Fig. 2 is a longitudinal sectional elevation. Figs. 3 and 4 are views similar to Fig. 1, illustrating the manner of adapting the improved device to different forms of harvester or mower actions.

The improved device may be easily adapted to all the various forms of harvesters and mowers manufactured; but for the purpose of illustration means are shown for connecting it to three general structures in common use; but it will be understood that I do not wish to be limited thereby in the use of the device, but reserve the right to its use in connection with any form of structure to which it is adapted.

The improved device comprises a casing 10, preferably tubular at the ends and with intermediate connecting-bars, one of the ends adapted to receive and rigidly support the "head" member 11 for connection to the operating machinery and the other end internally threaded and supporting for longitudinal adjustment therein a threaded sleeve 12, the latter preferably provided with a jam-nut 13.

A pitman 14 is slidably disposed through the sleeve 12 and is provided with a rigid stop-collar 15, spaced from the inner end within the member 10, as shown.

The inner end of the pitman extends relatively near the head member 11 and in practice will preferably enter the inner tubular end of the threaded "stub" 16, by which the latter is secured in the member 10, as shown in Fig. 2.

Surrounding the pitman 14 between the stop-collar 15 and the stub 16 of the head member 11 is a spring 17, and between the stop and the adjusting-sleeve 12 is another spring 18.

The stop-collar 15 may be formed integral with the pitman 14 or attached thereto by a screw or rivet 20 or by other fastening means, as preferred.

In operating sickle-bars severe jarring strains occur during the strokes, and the greatest resistance will be met with during the forward stroke, and to efficiently meet these strains the springs 17 18 are arranged to receive the thrusts from both directions, as indicated. The springs will be strong enough to resist the ordinary strains which the sickle-knives will encounter without permitting longitudinal movement between the pitman and casing during the strokes, but will yield under abnormal strains, which would otherwise rupture the parts. One or more washers 19 may be placed between the spring 18 and the sleeve 12 or between the spring and the stop 15 to regulate the length of the spring, if required. By this simple means the jars and concussions incidental to the operations of machinery to which this class of devices is applicable will be absorbed by the springs and not communicated to the connected parts.

In Fig. 3 a head member of the class employed on some forms of machines is shown, and in Fig. 4 a form of pitman connection is shown, such as is commonly used on some other forms of machine, to illustrate the adaptability of the device to various forms of machines without departing from the principle of the invention, as no change is thereby made in the operative parts.

Having thus described the invention, what I claim is—

1. A device of the class described, comprising a supporting-casing adapted for connection at one end to the driving mechanism, a pitman slidable longitudinally in said casing and having an intermediate stop, a spring disposed on said pitman between said stop and one end of the casing, and a spring on said pitman between said stop and the other end of said casing, substantially as described.

2. A device of the class described comprising a supporting-casing adapted for connection at one end to the driving mechanism, a pitman slidable longitudinally in said casing and having an intermediate stop, a spring between said stop and one end of the casing, a spring between said stop and the other end of said casing, and means carried by said casing for regulating the tension of said springs, substantially as described.

3. A connecting-rod of the class described comprising a head member having a casing extending therefrom internally threaded at its free end, a pitman slidable in said casing and having a stop intermediately thereof within said casing, a threaded sleeve surrounding said pitman and engaging the threads in the free end of said casing, a spring between said head member and intermediate stop, and a spring between said intermediate stop and said sleeve, substantially as described.

4. A connecting-rod of the class described, comprising a head member having a threaded stud, a casing internally threaded at its ends, and engaging said threaded stud at one end, a pitman slidable in said casing and having a stop intermediately thereof within said casing, a threaded sleeve surrounding said pitman and engaging the threads in the free end of said casing, a spring between said head-member stud and said intermediate stop, and a spring between said intermediate stop and said threaded sleeve, substantially as described.

In testimony that I claim the foregoing as my own I have hereto affixed my signature in the presence of two witnesses.

KNUTE RINGHEIM.

Witnesses:
C. E. MYERS,
MAUD CAMMACK.